(No Model.) 2 Sheets—Sheet 1.
E. G. LATTA.
VELOCIPEDE.

No. 444,637. Patented Jan. 13, 1891.

Witnesses:
Theo. L. Popp.
Emil J. Neuhart.

E. G. Latta, Inventor
By Wilhelm Bonner
Attorneys.

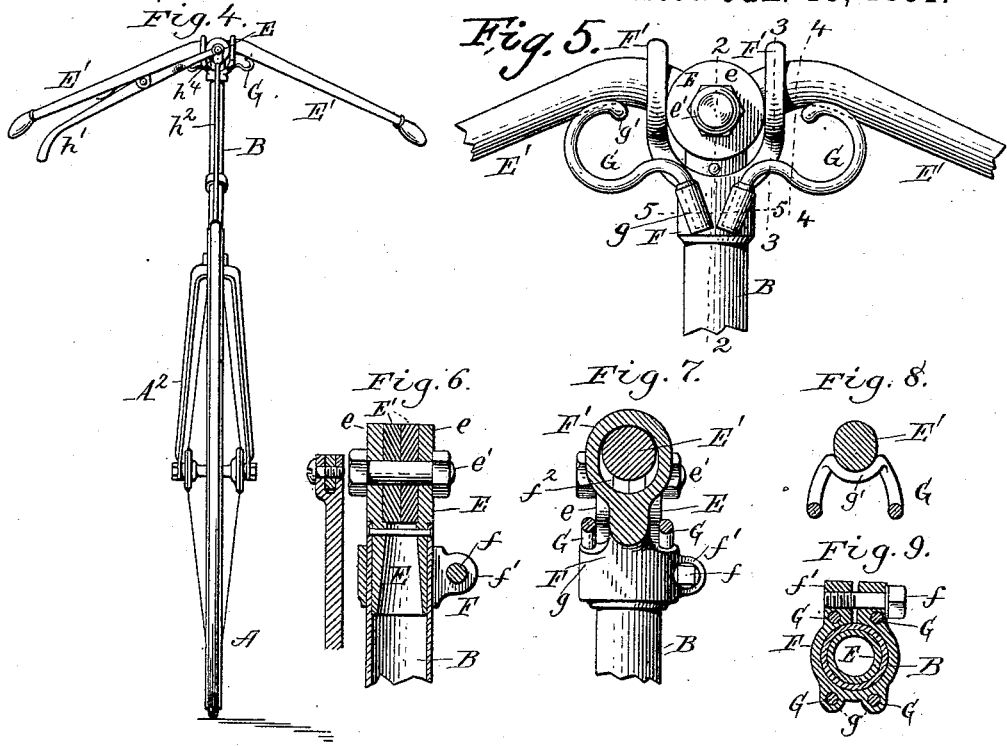

UNITED STATES PATENT OFFICE.

EMMIT G. LATTA, OF FRIENDSHIP, NEW YORK.

VELOCIPEDE.

SPECIFICATION forming part of Letters Patent No. 444,637, dated January 13, 1891.

Application filed January 22, 1890. Serial No. 337,740. (No model.)

*To all whom it may concern:*

Be it known that I, EMMIT G. LATTA, a citizen of the United States, residing at Friendship, in the county of Allegany and State of New York, have invented new and useful Improvements in Velocipedes, of which the following is a specification.

This invention has for its object to produce a bicycle suitable for all kinds of roads, and which may be conveniently used by riders of either sex.

The invention consists of various improvements in the construction of the main frame, handle-bars, brake device, and the driving mechanism, as will be hereinafter fully set forth, and pointed out in the claims.

Figure 1:
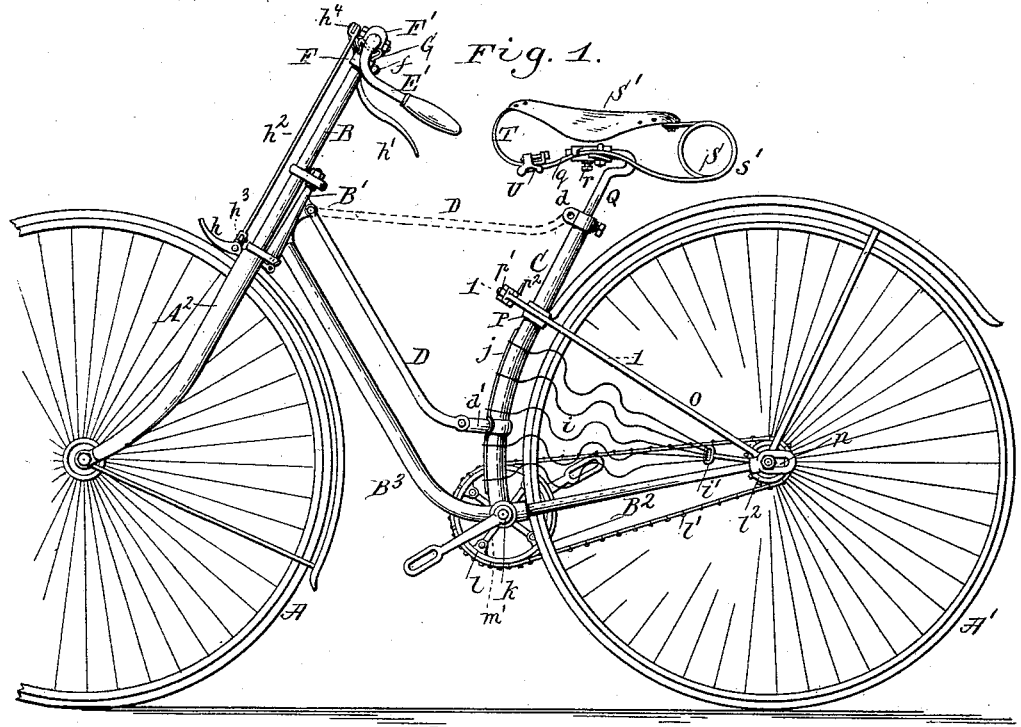
Figure 2:
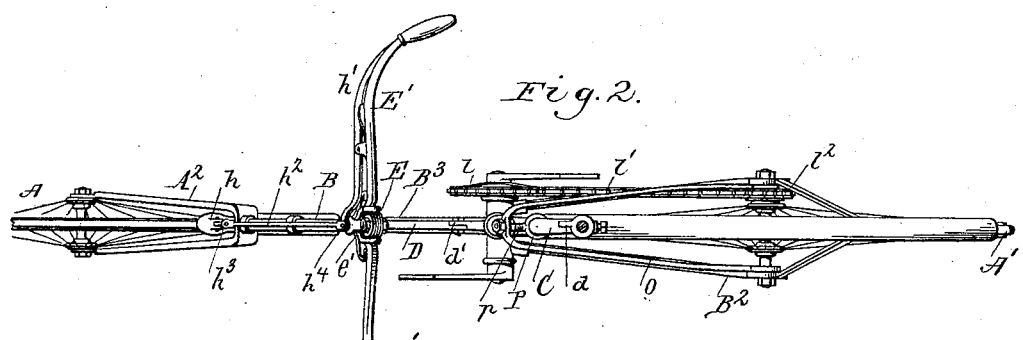
Figure 3:
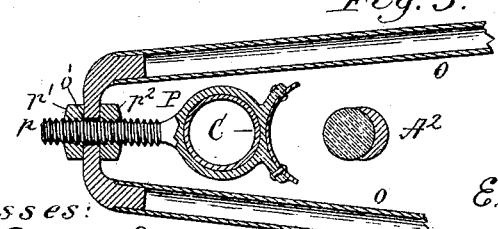

In the accompanying drawings, consisting of two sheets, Figure 1 is a side elevation of a bicycle embodying my improvements. Fig. 2 is a top plan view thereof with the saddle removed. Fig. 3 is a fragmentary longitudinal section of a part of the rear wheel-frame and connecting parts in line 1 1, Fig. 1, on an enlarged scale. Fig. 4 is a front elevation of the velocipede. Fig. 5 is a fragmentary front view of the upper portion of the steering-post and handle-bars on an enlarged scale. Fig. 6 is a vertical section in line 2 2, Fig. 5. Figs. 7 and 8 are similar sections in lines 3 3 and 4 4, Fig. 5, respectively. Fig. 9 is a horizontal section in line 5 5, Fig. 5.

Like letters of reference refer to like parts in the several figures.

A A' represent the front and rear wheels of the velocipede; $A^2$, the fork or frame of the front wheel; B, the tubular steering-post attached to the front fork; B', the steering-spindle; $B^2$, the lower fork of the rear wheel, and $B^3$ the depressed reach connected at its front end to the steering-spindle and at its opposite end to the lower fork of the rear wheel.

C is the upright saddle-post, arranged in front of the rear wheel and secured at its lower end to the rear portion of the reach.

D represents an adjustable brace or stiffening-bar connecting the steering-spindle with the upright saddle-post, and which may be placed in the depressed position represented by full lines in Fig. 1, so as to permit the machine to be used by a woman, or in the raised position represented by dotted lines in said figure, so as to render the frame of the machine stronger when used by a man, especially by a heavy rider on rough roads. The brace is attached at its front end to the neck of the steering-spindle by a connecting-bolt and at its rear end to the saddle-post by either of two clamps or clips $d\ d'$ and a connecting-bolt passing through the end of the brace and a perforated lug on each of said clips.

E represents a bifurcated head secured in the upper end of the steering-post by rivets or other means, and E' are the handle-bars, arranged with their inner overlapping end portions between the jaws $e$ of the head E and pivoted thereto by a horizontal bolt $e'$, as represented in Figs. 5 and 6, so as to be capable of swinging vertically on said pivot-bolt. The jaws of the bifurcated head E are preferably made circular and the enlarged inner ends of the handle-bars are made of corresponding form. The outer ends of the handle-bars are bent backward, so as to bring the handles nearly at right angles to the bars or substantially parallel with the pivot-bolt $e'$.

F represents an adjustable clip or divided slide surrounding the upper portion of the steering-post, and which is secured at any desired elevation on the post by a clamping-bolt $f$ passing through the lugs $f'$ of the clip, as represented in Figs. 6, 7, and 9. The clip F is formed with wings or extensions F', which project upwardly on opposite sides of the bifurcated head E and are each provided with a vertically-elongated opening $f^2$, through which the inner portion of the adjacent handle-bar passes, as represented in Figs. 5 and 7.

G G represent curved supporting-springs attached to the clip F on opposite sides of the steering-post and bearing with their free upper ends against the under side of the handle-bars E, so as to resist the downward movement of the latter. These springs are each composed of two branches or legs secured at their straight lower ends in sockets $g$, formed on the front and rear sides of the clip F and which are connected at their upper portions by a bow $g'$, upon which the handle-bar rests, as represented in Fig. 8. Each spring is preferably formed of a single piece of wire doubled at its center and bent to the semicircular form shown. The springs G G force the handle-bars upwardly against the upper edges of the elongated openings in the clip-extensions F', rendering the bars practically rigid against an upward pull. When the front wheel strikes an obstruction, the supporting-springs yield under the weight of the rider's arms and allow the handles to descend until the tension of the spring limits the further depression of the handle-bars, thereby greatly relieving the rider's arms from the shock and the vibrations of the machine. In case the machine receives a severe shock the handle-bars are limited in their downward movement by striking the lower edges of the elongated openings in the clip-extensions, the supporting-springs retarding the depression of the handle-bars and largely relieving the rider from the force of the shock.

Upon loosening the clamping-bolt of the clip F the latter may be adjusted up or down on the steering-post. This movement of the clip causes its extensions to swing the handle-bars upwardly or downwardly on the pivot-bolt $e'$, thereby raising and lowering the handles accordingly. After the clip has been properly adjusted, its clamping-bolt is again tightened.

When the machine is not in use, the handle-bars may be swung downwardly and inwardly for close storage by loosening the clamping-bolt of the clip F and moving the latter downwardly on the steering-post. The inner portions of the handle-bars are preferably bent downward slightly, as represented in the drawings, to permit the same to be folded inwardly as far as possible. A less expensive construction may be obtained by omitting the clip F and the supporting-springs G and tightening the nut of the pivot-bolt $e'$, so as to secure the handle-bars rigidly in the desired position. Should the owner afterward desire yielding handle-bars, he can procure the clip and springs and readily apply the same.

$h$ represents a brake pivoted at its rear end to the under side of the steering-post in the ordinary manner.

$h'$ is the brake-lever, pivoted to one of the handle-bars, and $h^2$ the rod connecting the brake-lever with the brake. The brake-rod is connected with the brake by a universal or swiveling connection $h^3$, and to the inner end of the brake-lever by a horizontal pivot-bolt $h^4$, arranged in line with the pivot-bolt $e'$, in which the handle-bars swing. This construction affords the brake rod and lever the necessary freedom of movement to operate the brake in the various elevations or adjustments of the handle-bars and permits the bars to be lowered for close storage without affecting the brake or requiring adjustment or removal of any of the parts.

By my improved construction and arrangement of the handle-bars the handles remain at a comfortable angle in all the different positions in which the bars may be placed.

$i$ represents guard-wires arranged on opposite sides of the front portion of the rear wheel, and forming a dress-guard, which prevents the garments of the rider from becoming entangled with the wheel. The wires of the guard extend from the central part of the wheel forwardly beyond the periphery thereof, and are preferably corrugated or of serpentine form, as shown, so as to cover a larger portion of the wheel.

The rear portions of the several wires constituting the dress-guard are attached to an eyebolt $i'$, secured to the lower rear fork, the ends of the wires being preferably bent to form hooks which engage with the eye of the bolt. Each wire $i$ extends from the eyebolt forwardly on one side of the wheel, thence around a supporting plate or strip $j$, attached to the front side of the saddle-post C, and thence backwardly on the opposite side of the wheel to the eyebolt. The strip $j$ is provided with seats or depressions $j'$ for the bent front portions of the wires, and is held in place by the projecting lug of the lower clip $d'$, which lug passes through an opening in the strip. The corrugations in the wires $i$, while increasing the area of the dress-guard, also render the wires elastic and capable of extension, thereby permitting the wires to be extended in hooking their ends over the eye of the bolt $i'$ and causing the same to retain their position by their tension and elasticity. The wires are by this construction always kept taut and prevented from rattling.

$k$ represents the horizontal crank-shaft, arranged between the front and rear wheels and supported in suitable bearings in the depressed portion of the main frame.

$l$ is the sprocket-wheel, secured to one side of the crank-shaft, and $l'$ the chain connecting said wheel with a sprocket-wheel $l^2$ on the axle of the rear wheel.

The lower fork of the rear wheel-frame is provided at its rear ends with slots or elongated openings $n$, in which the rear axle is adjustably arranged, so that the axle may be moved in the fork to adjust the tension of the driving-chain.

O is the upper fork of the rear wheel, the branches of which are flattened at their rear ends and provided with holes through which the rear axle passes. The fork O is also flattened at its front end, and provided in said flattened portion with a smooth opening $o'$, as represented in Fig. 3.

P represents a supporting clamp or clip secured to the upper portion of the saddle-post C, and $p$ a forwardly-projecting screw-shank formed on or secured to said clip and passing through the smooth opening $o'$ of the upper fork.

$p'$ $p^2$ are adjusting-nuts arranged upon the threaded shank $p$ and bearing against opposite sides of the flattened portion of the fork. When it is desired to adjust the drive-chain, the clamping-nuts applied to the end of the rear axle are loosened, so as to release the axle, and the latter, with its sprocket-wheel and the rear driving-wheel, are then moved in the lower fork toward or from the crank-shaft by adjusting the nuts upon the screw-shank $p$, the latter being stationary and the upper fork being adjusted forwardly and backwardly thereon. After effecting this adjustment the clamping-nuts of the rear axle are again tightened to retain the axle in place. By this construction the chain is readily adjusted with great nicety, and as both ends of the rear wheel-axle are adjusted simultaneously the wheel is kept in the center of its frame, with its axle parallel with the crank-shaft, without requiring the exercise of any special care in making adjustments.

I do not wish to claim in this specification the construction of the saddle shown in Fig. 1 of the drawings, as that forms the subject-matter of a separate application for patent filed by me November 10, 1890, Serial No. 370,934.

I claim as my invention—

1. The combination, with a steering-post and handle-bars pivoted at their inner portions to the post and capable of vertical adjustment, of means whereby the bars are held at any desired elevation, and handles attached to the outer ends of the handle-bars substantially at right angles thereto, whereby the handles retain the same angle in different positions of the handle-bars, substantially as set forth.

2. The combination, with a steering-post and handle-bars pivoted thereto and vertically adjustable thereon, of a vertically-adjustable spring-support, whereby the handle-bars are yieldingly sustained at different elevations, substantially as set forth.

3. The combination, with a steering-post and handle-bars pivoted thereto, of a vertically-adjustable spring-support bearing against the handle-bars, and an adjustable stop whereby the movement of the handle-bars is limited, substantially as set forth.

4. The combination, with a steering-post, of handle-bars pivoted thereto and bent upwardly and outwardly from the steering-post and thence backwardly, the backwardly-bent end portions of the bars being substantially parallel with the pivot of the bar, substantially as set forth.

5. The combination, with the steering-post and handle-bars pivoted thereto, of a clip adjustably attached to the steering-post and provided with upward extensions embracing the inner portions of the handle-bars, substantially as set forth.

6. The combination, with the steering-post and handle-bars pivoted thereto, of a clip adjustably attached to the steering-post and having upward extensions which embrace the handle-bars, and supporting-springs attached to said clip and bearing against the under side of the handle-bars, substantially as set forth.

7. The combination, with the steering-post and handle-bars pivoted thereto, of a clip adjustably attached to the steering-post and having upward extensions provided with elongated openings, through which the handle-bars pass, and supporting-springs attached to the clip and bearing against the under side of the handle-bars, substantially as set forth.

8. The combination, with the steering-post, the brake, and the vertically-movable handle-bars attached at their inner ends to the steering-post by a horizontal pivot, of a rigid brake-lever pivoted to one of the handle-bars, and a brake-rod connected to the brake-lever by a pivot arranged substantially in line with the pivot of the handle-bars, substantially as set forth.

9. The combination, with the steering-post, the brake, and the handle-bars pivoted at their inner ends to the steering-post, of a brake-lever pivoted to one of the handle-bars, a brake-rod attached at its upper end to the brake-lever by a pivot arranged substantially in line with the pivot of the handle-bars, and a universal or swiveling coupling connecting the lower end of the brake-rod with the brake, substantially as set forth.

10. The combination, with the wheels and frame of a velocipede, of a dress-guard composed of a series of elastic wires bent in serpentine form or corrugated and extending radially from the saddle-post to near the hub of the wheel, substantially as set forth.

11. The combination, with the wheels and frame of a velocipede, of a dress-guard composed of a series of elastic wires corrugated or bent in serpentine form, with the bends or corrugations increasing in radius from the hub toward the circumference of the wheel, substantially as set forth.

12. The combination, with the wheel and the main frame of a velocipede having a part or member adjacent to the periphery of the wheel, of a series of guard-wires secured at their ends to the fork or frame of the wheel and extending from the central portion of the wheel forwardly on one side thereof, thence around the part of the main frame adjacent to the periphery of the wheel, and backwardly to the central portion of the wheel on the opposite side thereof, substantially as set forth.

13. The combination, with a wheel and main frame of a velocipede, of a detachable supporting-plate attached to the frame in front of the periphery of the wheel, and a series of guard-wires passing around said supporting-plate, extending rearwardly on opposite sides of the wheel, and secured at their ends to the wheel-frame, substantially as set forth.

14. The combination, with the main frame, a wheel-frame, and a wheel-axle adjustably supported therein, of a fork or rod attached at one end to the wheel-axle and having its opposite end adjustably attached to the main frame, substantially as set forth.

15. The combination, with the main frame and a front steering and a rear driving-wheel, of a crank-shaft arranged between the wheels, a frame or support in which the axle of the rear wheel is adjustable with reference to the crank-shaft, a fork or rod pivoted at one end to the rear wheel-axle, and an adjusting-screw connecting the opposite end of said fork with the main frame, substantially as set forth.

16. The combination, with the main frame and a front steering and a rear driving wheel, of a crank-shaft arranged between the wheels, a frame or support in which the axle of the rear wheel is adjustable with reference to the crank-shaft, a screw attached to the main frame, a fork or rod attached at its rear end to the wheel-axle and engaging with its opposite end with said screw, and adjusting-nuts arranged on said screw, whereby the fork is shifted, substantially as set forth.

Witness my hand this 14th day of January, 1890.

EMMIT G. LATTA.

Witnesses:
C. J. RICE,
FRED N. RICE.